United States Patent
Abe et al.

(10) Patent No.: US 10,564,902 B2
(45) Date of Patent: Feb. 18, 2020

(54) DYNAMIC PARTITION ALLOCATION FOR TAPE FILE SYSTEM

(71) Applicant: International Business Machines Corporation, Armonk, NY (US)

(72) Inventors: Atsushi Abe, Ebina (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 14/967,453

(22) Filed: Dec. 14, 2015

(65) Prior Publication Data

US 2017/0169051 A1 Jun. 15, 2017

(51) Int. Cl.
*G06F 3/06* (2006.01)

(52) U.S. Cl.
CPC .......... *G06F 3/0682* (2013.01); *G06F 3/0608* (2013.01); *G06F 3/0644* (2013.01); *G06F 2003/0698* (2013.01); *G06F 2212/213* (2013.01)

(58) Field of Classification Search
CPC ............. G06F 2212/213; G06F 3/0682; G06F 3/0608; G06F 3/0644; G06F 2003/0698
See application file for complete search history.

(56) References Cited

U.S. PATENT DOCUMENTS

| | | | |
|---|---|---|---|
| 6,301,067 B1 * | 10/2001 | Takayama | G06F 3/0607 360/13 |
| 9,053,745 B2 | 6/2015 | Abe et al. | |
| 9,063,666 B2 | 6/2015 | Amir et al. | |
| 9,063,842 B1 * | 6/2015 | Fair | G06F 3/0686 |
| 2005/0050263 A1 * | 3/2005 | Ashton | G06F 3/061 711/111 |
| 2011/0238906 A1 | 9/2011 | Amir et al. | |
| 2012/0194935 A1 * | 8/2012 | Edling | G11B 5/00813 360/31 |
| 2012/0198289 A1 * | 8/2012 | Hostetter | G11B 5/00821 714/54 |

(Continued)

OTHER PUBLICATIONS

Linear Tape File System (LTFS) Format Specification, Apr. 12, 2010, LTFS Format Version 1:0 (Year: 2010).*

(Continued)

*Primary Examiner* — Masud K Khan
(74) *Attorney, Agent, or Firm* — Stephen R. Yoder; David B. Woycechowky (57) ABSTRACT

A tape drive system that uses a tape cartridge having more than one file storage partition, sometimes herein referred to as "virtual tapes." The tape file sub-system (which controls tape addressing) is identical to conventional single file storage partition tape cartridges, because: (i) a tape control sub-system controls writing of the multiple virtual tapes on a single tape cartridge, but communicates with the tape file sub-system as if the multiple virtual tapes were actually located on different physical tape cartridges; and (ii) a tape control sub-system controls reading of the multiple virtual tapes from a single tape cartridge, but communicates with the tape file sub-system as if the multiple virtual tapes were actually located on different physical tape cartridges. The multiple virtual tapes stored on a single physical tape cartridge are useful because they help circumvent certain "per tape restrictions" that are inherent in the tape file sub-system.

9 Claims, 5 Drawing Sheets

(56) References Cited

U.S. PATENT DOCUMENTS

| | | | |
|---|---|---|---|
| 2012/0323934 A1* | 12/2012 | Amir | G06F 17/30091 |
| | | | 707/752 |
| 2013/0007363 A1* | 1/2013 | Kassai | G06F 3/0607 |
| | | | 711/114 |
| 2014/0108720 A1* | 4/2014 | Abe | G06F 17/30067 |
| | | | 711/111 |
| 2014/0337575 A1 | 11/2014 | Matze et al. | |
| 2015/0062733 A1* | 3/2015 | Ashida | G06F 3/0613 |
| | | | 360/39 |
| 2015/0120741 A1 | 4/2015 | Abe et al. | |
| 2015/0127980 A1 | 5/2015 | Klein et al. | |
| 2015/0161161 A1 | 6/2015 | Iwanaga et al. | |

OTHER PUBLICATIONS

Moriyama, Masaaki, "New Possibilities for Tape Storage in the Age of Cloud and Big Data", Sponsored by: Fujifilm, Feb. 2014, White Paper, IDC Japan, Tokyo, 10 pages.

"File Systems" printed as of Jul. 22, 2015, provided by inventor in Main Idea of Disclosure dated Mar. 10, 2015, <https://technet.microsoft.com/en-us/library/cc766145(v=ws.10).aspx>, 3 pages.

\* cited by examiner

DYNAMIC PARTITION ALLOCATION FOR TAPE FILE SYSTEM

BACKGROUND

The present invention relates generally to the field of sequential access storage systems (for example, tape based storage systems), and, more particularly, to allocating partitions in sequential access storage systems. A "sequential access storage system" herein means a type of storage system, such as a magnetic tape, for which the medium is traversed sequentially (without skipping tracks as on a cylindrical or disk medium storage system) to gain read/write access to a given address.

A linear tape file system (LTFS) is an open standard format, including protocols for recording data on magnetic tape. LTFS is also software that enables access to data on a magnetic tape via a file system interface. In accordance with the LTFS format, a tape cartridge is typically divided into two partitions as follows: (i) an index partition which records meta-information such as information associated with the allocation of files; and (ii) a data partition which is used to record the data.

SUMMARY

According to an aspect of the present invention, there is a system including: (i) a first physical tape cartridge including a tape storage medium, a first file storage partition and a second file storage partition, with the first and second file storage partitions each being structured, programmed and/or located to store data files on the tape storage medium; (ii) a tape reading/writing sub-system structured and/or programmed to read data from and write data to the tape storage medium; (iii) a tape file sub-system structured and/or programmed to control an addressing scheme used for writing data to and reading data from the tape storage medium, with the tape file sub-system implementing a first per-tape restriction restricting an amount of data and/or files that can be written to a single physical tape cartridge; and (iv) a tape control sub-system structured and/or programmed to control the tape reading/writing sub-system and the tape file sub-system. The tape control sub-system is further structured and/or programmed to control operations of the tape reading/writing sub-system and the tape file sub-system so that the first per-tape restriction is applied as if the first and second file storage partitions are separate physical tape cartridges.

According to a further aspect of the present invention, there is a tape drive system for use with a physical tape cartridge including a tape storage medium, the tape drive system including: (i) a tape reading/writing sub-system structured and/or programmed to read data from and write data to the tape storage medium; (ii) a tape control sub-system structured and/or programmed to control the tape reading/writing sub-system to write a plurality of partition sets on the tape storage medium, with each partition set including a file storage partition; and (iii) a tape file sub-system structured and/or programmed to control an addressing scheme so that each partition set is addressed as an independent file system.

According to a further aspect of the present invention, there is a method and/or computer program product for use with a tape drive system and a physical tape cartridge including a tape storage medium, that performs the following operations (not necessarily in the following order): (i) providing: a tape reading/writing sub-system structured and/or programmed to read data from and write data to the tape storage medium, a tape control sub-system, and a tape file sub-system; (ii) writing, by the tape reading/writing sub-system under control of the tape control sub-system a plurality of partition sets on the tape storage medium, with each partition set including a file storage partition; and (iii) controlling, by the tape file sub-system, an addressing scheme so that each partition set is addressed as an independent file system.

DETAILED DESCRIPTION

Some embodiments of the present disclosure are directed to a tape drive system that uses (and/or includes) a tape cartridge having more than one file storage partition. These multiple file storage partitions are sometimes herein referred to as "virtual tapes." In some embodiments, each file storage partition has an associated index partition. In these embodiments, each set including an index partition and a file storage partition (along with any other partitions supporting the virtual file storage partition) may be referred to a "virtual tape partition set." In some embodiments, the tape file sub-system (which controls tape addressing) is exactly the same as it is for conventional single file storage partition tape cartridges, because: (i) a tape control sub-system controls writing of the multiple virtual tapes on a single tape cartridge, but communicates with the tape file sub-system as if the multiple virtual tape partitions were actually located on different physical tape cartridges; and (ii) a tape control sub-system controls reading of the multiple virtual tape partitions from a single tape cartridge, but communicates with the tape file sub-system as if the multiple virtual tape partitions were actually located on different physical tape cartridges.

In some embodiments, the multiple virtual tapes stored on a single physical tape cartridge are useful because they help to get around certain "per tape restrictions" that have been structured and/or programmed into the tape file sub-system. Examples of per-tape restrictions programmed and/or structured into the tape file sub-system may include: (i) number of files allowed to be stored in a single file storage partition; and/or (ii) amount of data allowed to be stored on a single file storage partition. Because the tape file system is given information, by the tape control sub-system, consistent with the multiple virtual tapes being located respectively in separate physical tape cartridges (even though they are not), the per-tape restrictions are applied on a per-file storage-partition basis, rather than on a per-tape basis.

Figure 1:
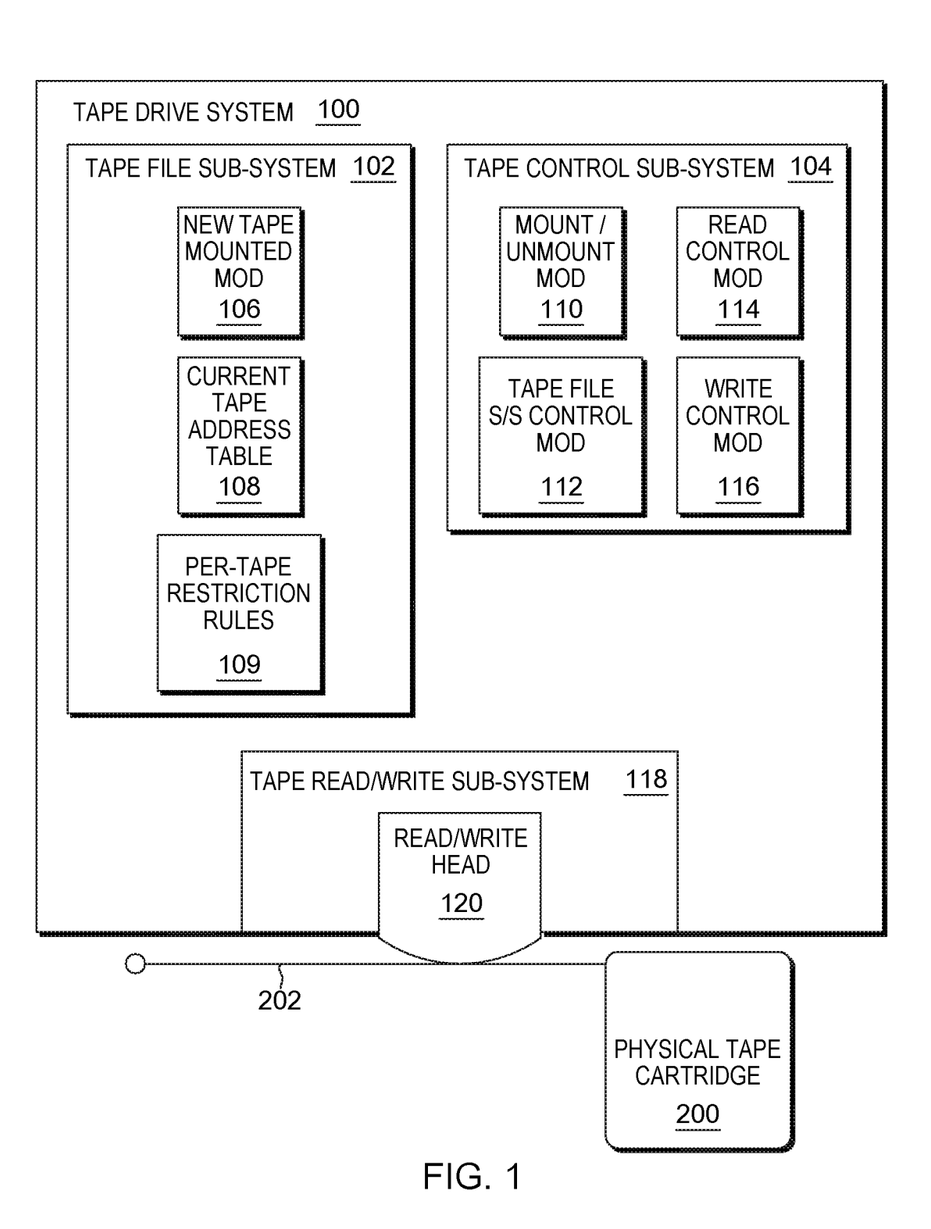
FIG. 1 is a block diagram of a first embodiment of a system according to the present invention.

As shown in FIG. 1, tape drive system 100 is used with physical tape cartridge 200 (including tape medium 202). System 100 includes: tape file sub-system 102; tape control sub-system 104; and tape read/write sub-system 118. Tape file sub-system 102 includes: new tape mounted module ("mod") 106; current tape address table 108; and per-tape restriction rules 109. Tape control sub-system 104 includes: mount/unmount mod 110; tape file sub-system control mod 112; read control mod 114; and write control mod 116. Tape read/write sub-system 118 includes read/write head 120. In operation: (i) read/write head 120, under direct control of tape read/write sub-system 118 magnetically writes data to and reads data from tape medium 202; (ii) tape file sub-system controls addressing of partitions and/or files stored on tape medium 202; and (iii) tape control sub-system 104 controls the overall operations including control and management of tape file sub-system 102 and tape read/write sub-system 118.

Physical tape cartridge 200 includes tape medium 202 with a first file storage partition and a second file storage partition being written on medium 202. The first and second partitions are each structured, programmed and/or located to store data files on the tape medium. In other words, data written to the tape medium, in the form of files, can be stored in either (or both) of the first and second file storage partitions. In the embodiment of FIG. 1, the first and second file storage partitions are each considered as "virtual tapes."

Tape reading/writing sub-system 118 structured and/or programmed to read data from and write data to the tape storage medium. In this embodiment, sub-system 118 is a conventional tape reading/writing sub-system and includes a conventional read/write head 120 for producing, and/or having induced in it, the magnetization states associated with reading data from and writing data to a tape medium.

Tape file sub-system 102 directly controls and manages an addressing scheme used for writing data to and reading data from tape medium 202. Tape file sub-system 102 implements, through per-tape restriction rules 109, a set of per-tape restriction(s) restricting an amount of data and/or files that can be written to a single physical tape cartridge. It is noted that although these restrictions are called "per-tape restrictions because these restrictions were written into tape file sub-system with the intention of limiting an amount of data, and/or files, that could be put on a tape, the present invention effectively overcomes these "per tape restrictions" in the sense that tape file sub-system 102 is provided information so that it treats partition sets (for example, index and data partition sets) within a tape as separate tapes, and sets up a dedicated filing system for each partition sets. Accordingly, under some embodiments of the present invention, the per-tape restrictions operate, instead, as per-partition-set restrictions. However, they will herein be called "per-tape restrictions" in order to emphasize the fact that they were intended to be restrictions applied to a whole tape, rather than to a mere partition set. New tape mounted mod 106 indicates when a new tape cartridge is mounted, such that current tape address table 108 is refreshed to correspond to the status of the new tape cartridge that has been mounted.

Tape control sub-system 104 controls and manages tape reading/writing sub-system 118 and tape file sub-system 102. Mount/unmount mod 110, through tape file sub-system control mod 112, informs new tape mounted mod 106 when a new tape cartridge is mounted. However, in this embodiment of the present invention, mount/unmount mod 110, through tape file sub-system control mod 112, also informs new tape mounted mod 106 that a new tape cartridge is mounted when switching between the first and second file storage partitions (that is, switching between virtual tapes) even though no new physical tape cartridge has, in fact, been mounted. In this way, the tape control sub-system controls operations of the tape reading/writing sub-system and the tape file sub-system so that the set of per-tape restriction(s) of per-tape restriction rules 109 are applied as if the first and second file storage partitions are separate physical tape cartridges.

Figure 2:
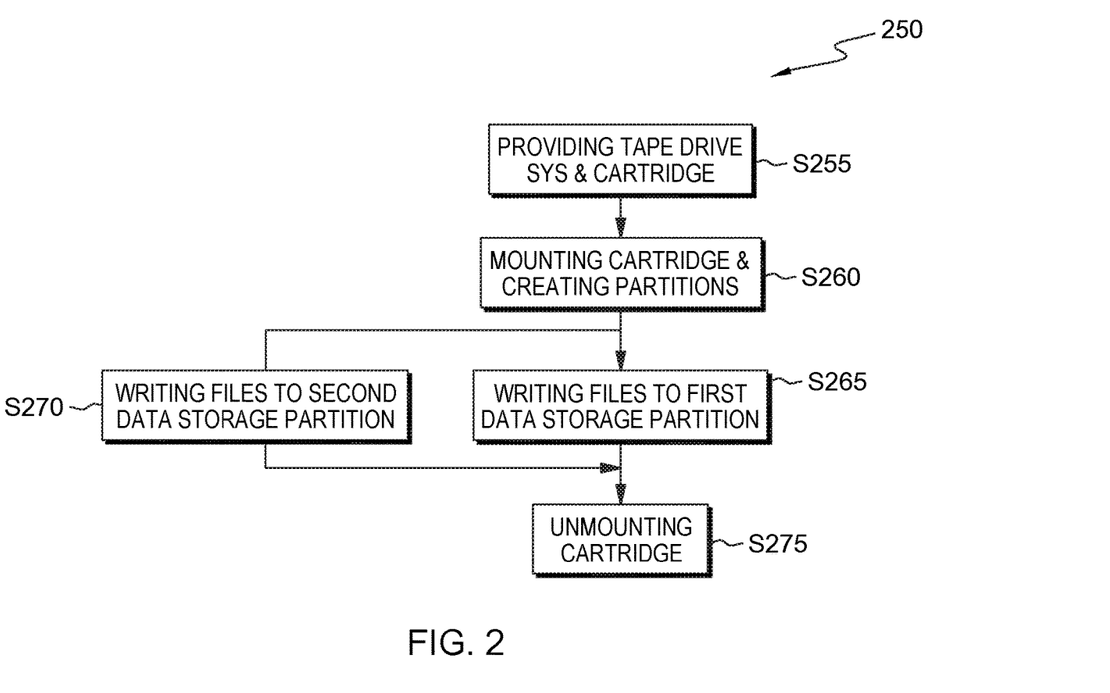
FIG. 2 is a flowchart showing a first embodiment method performed, at least in part, by the first embodiment system.

As shown in FIG. 2, flowchart 250 shows a method for using system 100 to store files on cartridge 200 using virtual tapes to get around the per-tape restrictions of per-tape restriction rules 109 of tape file sub-system 102.

Processing begins at operation S255, where the following equipment is provided: (i) first physical tape cartridge 200 including a tape medium 202, first file storage partition and a second file storage partition, with the first and second partitions each being structured, programmed and/or located to store data files on tape medium 202, (ii) tape reading/writing sub-system 118 structured and/or programmed to read data from and write data to the tape storage medium, (iii) tape file sub-system 102 that controls an addressing scheme used for writing data to and reading data from the tape medium, with the tape file sub-system implementing a first per-tape restriction (by per-tape restriction rules 109) intended to restrict an amount of data and/or files that can be written to a single physical tape cartridge, and (iv) tape control sub-system 104 that controls the tape reading/writing sub-system and the tape file sub-system. As mentioned above, even though the per-tape restrictions of per-tape restriction rules 109 are intended to restrict what can be written to a single tape cartridge, in system 100 these rules instead serve to restrict what can be written to a single partition set.

Processing proceeds to operation S260, where mount/unmount mod 110 controls the mounting of physical tape cartridge 200 by: (i) controlling cartridge 200 and its tape medium 202 to be moved into position proximate to read/write head 120; and (ii) indicating by tape file sub-system control mod 112 to new tape mounted mod 106 that a new physical tape cartridge has been mounted. At operation S260, write control mod writes the first and second file storage partitions (and respectively associated index partitions) on tape medium 202 of single physical tape cartridge 200. When switching from one virtual partition set to the other, tape file sub-system control mod 112 indicates that a new tape is mounted to new tape mounted mod 106, even though a new tape hasn't been mounted. In this way current tape address table 108 refreshes each time there is a switch between virtual tape partition sets, despite the fact that the physical tape cartridge has not been changed.

Processing proceeds to temporally overlapping operations S265 and S270, where write control mod 114, tape read write sub-system 118 and read/write head 118 write: (i) a first plurality of files to the first file storage partition of tape medium 202 (that is, operation S265); and (ii) a second plurality of files to the second file storage partition of tape medium 202 (that is, operation S270). As operations S265 and S270 proceed in parallel, the writing of first and second pluralities of files, considered in the aggregate, violate the restriction(s) of per tape restriction rules 109. However, the writing is nevertheless allowed because tape file sub-system 102 has set up a separate file system directory for each of the first and second partitions. This means that the restrictions do not apply to tape medium 202, considered as a whole, but, rather, apply separately to the first file storage partition and the second file storage partition. More specifically, and as mentioned above, when switching from one virtual partition set to the other, tape file sub-system control mod 112 indicates that a new tape is mounted to new tape mounted mod 106, even though a new tape hasn't been mounted. In this way current tape address table 108 refreshes each time there is a switch between virtual tape partition sets, despite the fact that the physical tape cartridge has not been changed. This means that the per-tape restriction rules 109 are applied on a virtual partition set by virtual partition set basis, in addition to being applied on a per-tape basis.

Processing proceeds to operation S275, where physical tape cartridge 200 is going to be switched out for another tape cartridge of the tape cartridge library (not shown in the Figures), so mount/unmount mod 110 controls actual unmounting of physical tape cartridge 200. This is the first time, in the performance of this method, that cartridge 200 is actually unmounted (for example, moved away from head 120), despite the fact that unmounting was reported by tape file sub-system control mod 112 to new tape mounted mod every time operations switched between the first and second virtual partition sets of cartridge 200.

Some embodiments of the present invention may include one, or more, of the following features, characteristics and/or advantages: (i) efficiently uses the capacity of a tape cartridge using a linear tape file system (LTFS); and/or (ii) provides a method to dynamically allocate an index partition and/or a data partition. In some embodiments of the present invention, a tape cartridge is divided, in advance of use, into four or more partitions. When use of the tape cartridge is started, two of the four or more partitions are used, one as an index partition, and the other as a data partition. When the remaining capacity of the data partition becomes insufficient, unused partitions are additionally used as the data partition.

When the total number of files and directories being stored reaches a predetermined number, no additional files can be stored. However, if two or more unused partitions are available, two of the unused available partitions are used, one as the index partition and the other as the data partition, thereby allowing the tape cartridge to be continuously used as if it were a new tape cartridge.

Some embodiments of the present invention make it possible effectively to use the capacity of a tape cartridge while avoiding a problem wherein the amount of the meta-information becomes too large.

Some embodiments of the present invention are implemented by extension of a linear tape file system (LTFS) in the form of software. The number of partitions into which one single tape cartridge can be divided depends on the functionality of the tape drive. Some conventional tape drives incorporate a function for dividing one tape cartridge into two partitions. It is technically feasible to divide a tape into two or more partitions. Some embodiments of the present invention use a tape drive that is capable of dividing a tape cartridge into four or more partitions, wherein the tape cartridge can be divided into n+1 partitions (p0, p1, ..., pn).

The following symbols are used in this disclosure:

W: The maximum number of files and directories that can be stored in a conventional tape cartridge.

U: A table in which the partition usage status is stored (see Table U below).

TABLE U

| Partition Usage Status | |
| --- | --- |
| Partition ID | Usage Status |
| p0 | i |
| p1 | d0 |
| p2 | d0 |

TABLE U-continued

| Partition Usage Status | |
| --- | --- |
| Partition ID | Usage Status |
| p3 | i |
| p4 | d3 |
| p5 | e |
| p6 | e |
| p7 | e |

Where i, d, and e represent the following partitions, respectively:

i: index partitions;

dn: a data partition which is used along with pn; and e: unused partition

In some embodiments of the present invention, the example of Table U represents a tape cartridge that is divided into eight partitions (p0, ..., p7), wherein: p0 and p3 are index partitions; p1, p2, and p4 are data partitions; p5, p6, and p7 are unused partitions; data that corresponds to the meta-information of p0 is stored in p1 and p2; and data that corresponds to the meta-information of p3 is stored in p4.

Figure 3:
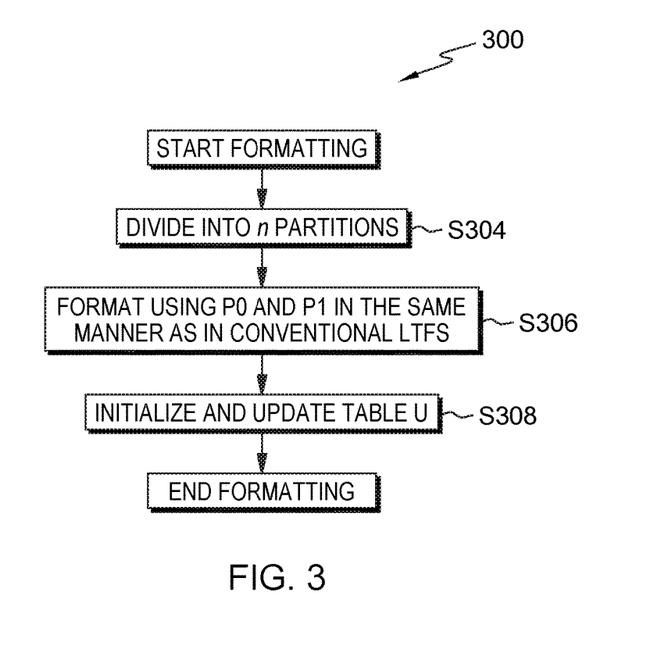
FIG. 3 is a flowchart of a second embodiment of a method according to the present invention.

As shown in flowchart 300 of FIG. 3, some embodiments of the present invention perform the following operations when a tape cartridge is formatted: (i) the LTFS divides the tape cartridge into n partitions (operation S304); (ii) LTFS carries out formatting in the same manner as in conventional LTFS, wherein p0 is defined to be the index partition and p1 is defined to be the data partition (operation S306); (iii) table U is initialized and updated to indicate that all partitions except p0 and p1 are unused partitions (operation S308).

Initialization and updating of Table U are carried out in a memory unit of the LTFS. Table U is also stored in the tape cartridge so that at least one copy of Table U can be used for both mounting and un-mounting of the tape cartridge. In some embodiments of the present invention, Table U is stored in a predetermined storage location of the tape cartridge, for example, in cartridge memory (CM) of the tape cartridge.

In some embodiments of the present invention, operations performed at the time of mounting of a tape cartridge include: (i) the tape cartridge is physically mounted into a drive unit; (ii) the LTFS reads table U from the tape cartridge; and/or (iii) the LTFS operates assuming that there exists a directory that corresponds to the used index partition (hereinafter referred to as a "partition directory").

Figure 4:
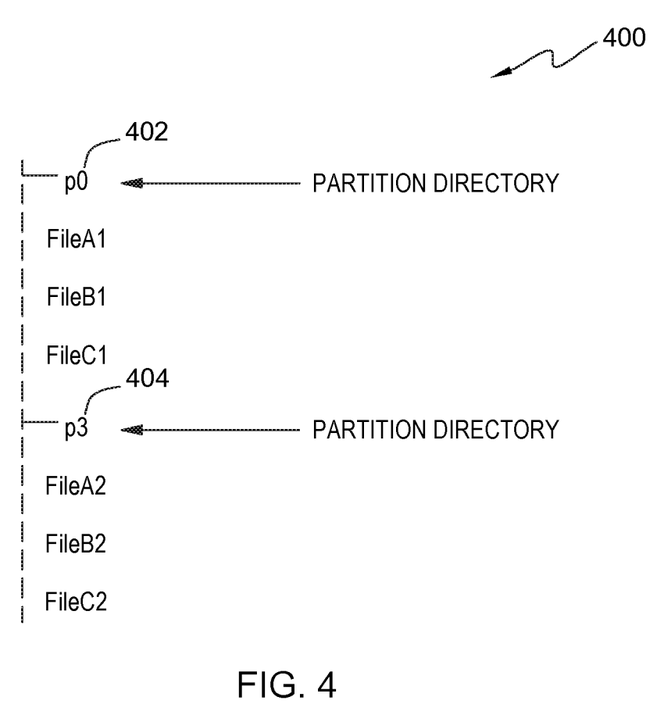
FIG. 4 is a diagram of a directory structure showing information that is helpful in understanding embodiments of the present invention.

For example, if a tape cartridge is mounted that is in accordance with a directory structured as shown in directory structure 400 of FIG. 4, partition directories p0 and p3 (402 and 404 respectively) become viewable and are used as an index partition.

In some embodiments of the present invention, when a partition directory is accessed, meta-information of the corresponding index partition is read, so that files and directories stored in the partition can be accessed.

In some embodiments of the present invention meta-information of all index partitions in a tape cartridge is read upon mounting of the tape cartridge.

In some embodiments of the present invention, when files and directories under a partition directory are accessed: (i) meta-information of the corresponding index partition is identified; (ii) the corresponding data partition, used along with that index partition, is identified; (iii) the index partition/data partition combination is handled as a virtual tape cartridge (hereinafter referred to as a "virtual tape"), and appears, to LTFS, as a conventional tape cartridge.

Figure 5:
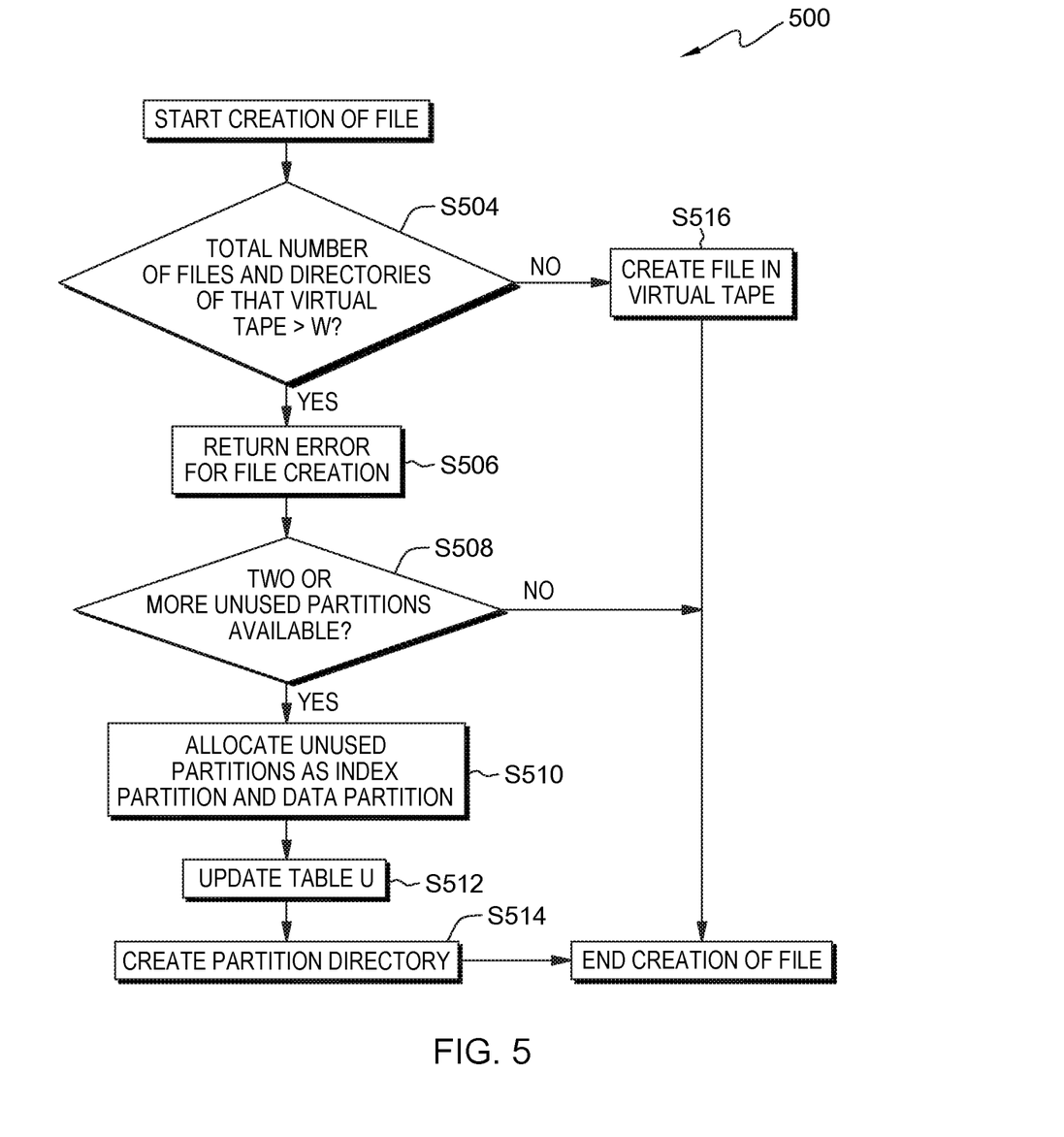
FIG. 5 is a flowchart of a third embodiment of a method according to the present invention.

Flowchart 500 of FIG. 5 shows operations performed to create files and/or directories, in some embodiments of the present invention. When files and directories are created in the virtual tape, it is checked whether or not the total number of files and directories contained in the virtual tape exceeds the number W (decision S504). If the result of checking is negative (decision S504, "No" branch), then the file is created in the virtual tape (operation S516) as normal. If the result of checking is positive (decision S504, "Yes" branch), then it is regarded as error (operation S506).

At this point, the table U is checked (decision S508). If there are not available two or more unused partitions (decision S508, "No" branch), the files and/or directories are not created. If two or more unused partitions are available (decision S508, "Yes" branch), then two unused partitions are respectively allocated as a new index partition and a new data partition (operation S510) and table U is updated (operation S512). Further, a partition directory is created (operation S514) and the two new partitions are handled as a virtual tape and it is then possible for a user to store files and directories in the new partition directory.

When an inquiry about the remaining tape capacity is made while a virtual tape is used, a reply to the inquiry includes notification of the remaining capacity, assuming that unused partitions, as well as the data partition used in the virtual tape, are all used as data partitions. In particular, tape capacity immediately after formatting is almost the same as that in a normal LTFS. More accurately stated, the capacity is decreased by an amount of space used in creation of the partition. However this decrease in capacity is typically insignificant.

Figure 6:
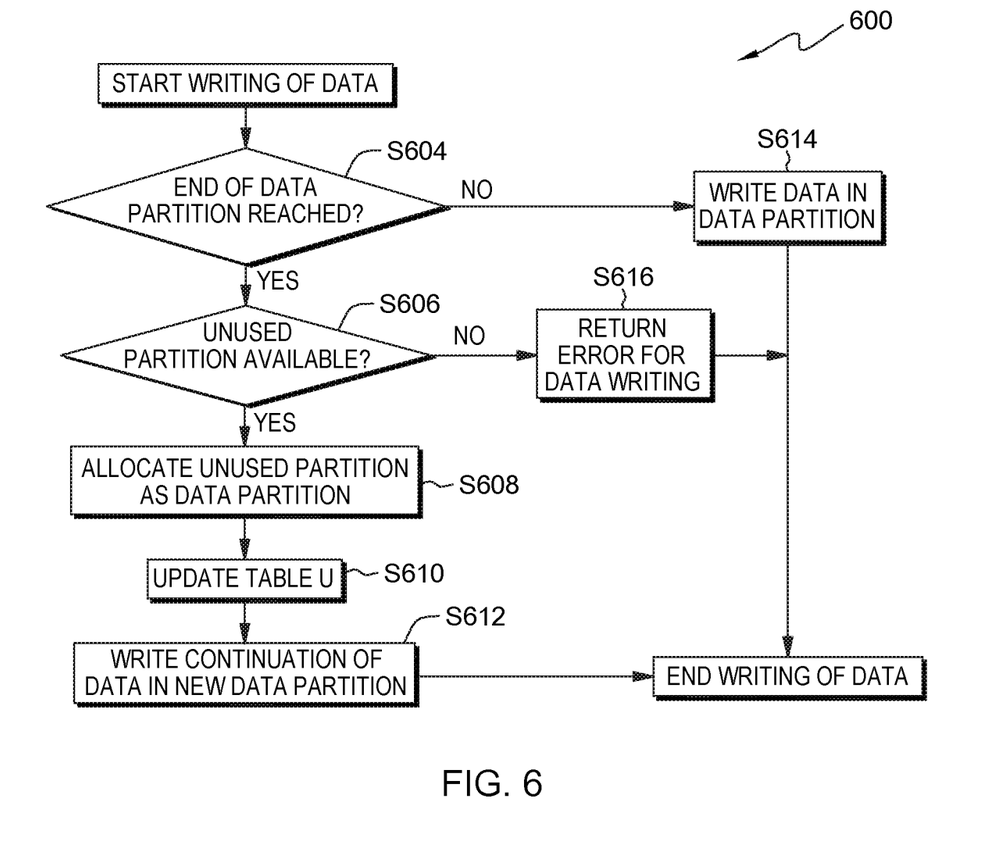
FIG. 6 is a flowchart of a fourth embodiment of a method according to the present invention.

Flowchart 600 of FIG. 6 includes the following operations regarding writing of data in some embodiments of the present invention (with process flow among and between the operations as shown by arrows in FIG. 6): S604, S606, S608, S610, S612, S614, and S616.

Note: When the end of a data partition is reached while data is being written (decision S604, "Yes" branch), and an unused partition is available (decision S606, "Yes" branch), an unused partition is allocated as a new data partition (operation S608), table U is updated (operation S610), and subsequent data is written in the new data partition (operation S612).

As the index of the LTFS (the meta-information), an extent of a file (a contiguous area of storage reserved for a file) may be divided into multiple partitions. This is not compliant with the conventional LTFS format. However, some embodiments of the present invention extend LTFS by adding information on the partitions to the extent of the file.

For example, a file (aa.txt) is written in a state where it is divided into partitions p1 and p2 as described below. In some embodiments of the present invention, in this case, information on the partitions is recorded for each extent by writing "<partition>" in the information of the extent as described below.

```
<file>
    <name>aa.txt</name>
    <length>6</length>
    <readonly>false</readonly>
    <creationtime>2013-12-24T05:51:55.553964913Z</creationtime>
    <changetime>2013-12-24T05:58:48.293149600Z</changetime>
    <modifytime>2013-12-24T05:58:14.568599785Z</modifytime>
    <accesstime>2013-12-24T05:51:55.553964913Z</accesstime>
    <backuptime>2013-12-24T05:51:55.553964913Z</backuptime>
    <fileuid>3</fileuid>
    <extentinfo>
```

-continued

```
        <extent>
            <partition>p1</partition> (tag denoting a partition added in some
            embodiments of the present invention)
            <fileoffset>0</fileoffset>
            <partition>b</partition>
            <startblock>8</startblock>
            <byteoffset>0</byteoffset>
            <bytecount>3</bytecount>
        </extent>
        <extent>
            <partition>p2</partition> (tag denoting a partition added in some
            embodiments of the present invention)
            <fileoffset>3</fileoffset>
            <partition>b</partition>
            <startblock>12</startblock>
            <byteoffset>0</byteoffset>
            <bytecount>3</bytecount>
        </extent>
    </extentinfo>
</file>
```

In some embodiments of the present invention, when a tape cartridge is un-mounted, meta-information is written in the data partition and the index partition by means of the virtual tape, in the same or similar manner as in conventional LTFS, and table U in particular is also written in the tape (for example, it is written in the cartridge memory (CM)).

In some embodiments of the present invention, configuration and procedures described above effectively (more fully) use the capacity of a tape because a new virtual tape is created and used when: (i) a single tape cartridge is used; (ii) the maximum number of directories and files (W) has been reached; and (iii) unused partitions are available.

In some embodiments of the present invention, as shown above, an example implementation has been described where partitions are divided at the time of formatting of the tape cartridge to be used. Alternatively, another implementation may be contemplated where only two small partitions are divided at the time of formatting and additional partitions are created as more partitions become necessary.

In some embodiments of the present invention, as shown above, an example implementation has been described in which unused partitions are started to be used as a virtual tape when creation of a file is unsuccessful (an error condition). Alternatively, another implementation is contemplated in which a command for creating a virtual partition is provided so that the virtual tape can be put into use, even in the absence of an error condition.

Some embodiments of the present invention may include one, or more, of the following features, characteristics and/or advantages: (i) treats a single partitioned tape (a single physical tape) as if it is multiple (more than one), separate, different and distinct physical tapes, where each of the multiple separate, different and distinct tapes is called a "virtual tape"; (ii) there are multiple virtual tapes in one tape cartridge; (iii) switching from a first virtual tape to a second virtual tape (including when the two virtual tapes reside in the same tape cartridge and/or on the same tape medium) involves unmounting the first virtual tape and mounting the second virtual tape; (iv) unmounting and mounting virtual tapes that reside in the same tape cartridge and/or on the same tape medium does not require physically removing/replacing the tape cartridge, it merely means that the file system (LTFS, for example) performs conventional unmounting and mounting operations; (v) for mounting a virtual tape, some meta information is read from an index partition, and/or cartridge memory; (vi) an operation to unmount a virtual tape may include writing meta information into the index partition of the virtual tape; and/or (vii) an operation to mount a virtual tape may include reading meta information from the index partition of the virtual tape.

In some embodiments of the present invention, certain conditions trigger automatic allocation of a new virtual tape (by way of automatic and dynamic partitioning). Consider a tape medium that is in use, and is operating as a current virtual tape. Conditions that trigger allocation of a new virtual tape include situations where the current virtual tape: (i) reaches its data limit; (ii) reaches a limit in the number of files it can store; (iii) reaches a limit in the number of directories it can store; and/or (iv) reaches a limit imposed by the addressing scheme, or any other aspect of the file system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following paragraphs set forth some definitions for use in connection with this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A tape drive system for use with a physical tape cartridge including a tape storage medium, the tape drive system comprising:
    a tape reading/writing sub-system structured and/or programmed to read data from and write data to the tape storage medium, with the tape storage medium including a plurality of data storage partitions, with each given data storage partition of the plurality of data storage partitions including a set of data storage capacity rule(s);
    a tape control sub-system structured and/or programmed to control the tape reading/writing sub-system to write a first set of data on a given data storage partition of the plurality of data storage partitions on the tape storage medium;
    a tape file sub-system structured and/or programmed to control an addressing scheme so that each given data storage partition of the plurality of data storage partitions is addressed as an independent multiple partition file system, with the addressing scheme based, at least in part, upon the set of data storage capacity rule(s) that restricts a first number of files that can be written onto each given data storage partition of the plurality of data storage partitions;
    the tape reading/writing sub-system structured and/or programmed to attempt to write the first set of data on a first data storage partition, with the first set of data including a first number of files that is in excess of the data storage capacity of the tape storage medium;
    the tape control sub-system structured and/or programmed to write the first number of files of the first set of data to a first data storage partition, with the first number of files of the first set of data being a maximum number of files that can be stored on any given data storage partition that is determined by the set of data storage capacity rule(s); and
    the tape control sub-system structured and/or programmed to write a second number of files of the first set of data to a second data storage partition, with the second number of files of the first set of data being the difference between the number of files in the first set of data, in both the first data storage partition and in the second data storage partition, and the number of files of the first set of data.

2. The tape drive system of claim 1 wherein the tape file sub-system is further structured and/or programmed to control the addressing scheme so that the first number of files within each given data storage partition of the plurality of data storage partitions is addressed as an independent linear tape file system (LTFS) file system.

3. The tape drive system of claim 1 wherein each given data storage partition respectively corresponds to a virtual tape, with each virtual tape being a set of data that is treated as an entirety of a single tape medium by computer components that read from and/or write to the virtual tape.

4. A computer program product for controlling operations of a tape drive system including a tape reading/writing sub-system structured and/or programmed to read data from and write data to the tape storage medium, a tape control sub-system, and a tape file sub-system, and a physical tape cartridge including a tape storage medium, the computer program product comprising a computer readable storage medium having program instructions embodied therewith, the program instructions executable by a processor(s) set of the tape drive system to cause the tape drive system to:

write, by the tape reading/writing sub-system under control of the tape control sub-system, a first set of data on a given data storage partition of a plurality of data storage partitions on the tape storage medium;

control, by the tape file sub-system, an addressing scheme so that each given data storage partition of the plurality of data storage partitions is addressed as an independent multiple partition file system, with the addressing scheme based, at least in part, upon a set of data storage capacity rule(s) that restricts a first number of files that can be written onto each given data storage partition of the plurality of data storage partitions;

attempt to write, by the tape reading/writing sub-system, the first set of data on a first data storage partition, with the first set of data including a first number of files that is in excess of the data storage capacity of the tape storage medium;

write, by the tape control sub-system, the first number of files of the first set of data to a first data storage partition, with the first number of files of the first set of data being a maximum number of files that can be stored on any given logical data storage partition that is determined by the set of data storage capacity rule(s); and write, by the tape control sub-system, a second number of files of the first set of data to a second data storage partition, with the second number of files of the first set of data being the difference between the number of files in the first set of data, in both the first data storage partition and in the second data storage partition, and the number of files of the first set of data;

wherein:
the tape storage medium includes a plurality of data storage partitions; and
each given data storage partition of the plurality of data storage partitions includes a set of data storage capacity rule(s).

5. The computer program product of claim 4 wherein the control of the addressing scheme is performed by the tape file sub-system so that the first number of files of each given data storage partition of the plurality of data storage partitions is addressed as an independent linear tape file system (LTFS) file system.

6. The computer program product of claim 4 wherein each given data storage partition respectively corresponds to a virtual tape, with each virtual tape being a set of data that is treated as an entirety of a single tape medium by computer components that read from and/or write to the virtual tape.

7. A computer-implemented method for use with a tape drive system and a physical tape cartridge including a tape storage medium, the method comprising:

providing:
a tape reading/writing sub-system structured and/or programmed to read data from and write data to the tape storage medium,
a tape control sub-system, and
a tape file sub-system;

reading data from and writing data to the tape storage medium by tape reading/writing sub-system, with the tape storage medium including a plurality of data storage partitions, with each given data storage partition of the plurality of data storage partitions including a set of data storage capacity rule(s);

controlling, by the tape control sub-system, the tape reading/writing sub-system to write a first set of data on a given data storage partition of the plurality of data storage partitions on the tape storage medium;

controlling, by the tape file sub-system, an addressing scheme so that each given data storage partition of the plurality of data storage partitions is addressed as an independent multiple partition file system, with the addressing scheme based, at least in part, upon the set of data storage capacity rule(s) that restricts a first number of files that can be written onto each given data storage partition of the plurality of data storage partitions;

attempting to write, by the tape reading/writing sub-system, the first set of data on a first data storage partition, with the first set of data including a first number of files that is in excess of the data storage capacity of the tape storage medium;

writing, by the tape control sub-system, the first number of files of the first set of data to a first data storage partition, with the number of files of the first set of data being a maximum amount of data that can be stored on any given data storage partition that is determined by the set of data storage capacity rule(s); and writing, by the tape control sub-system, a second number of files of the first set of data to a second data storage partition, with the second number of files of the first set of data being the difference between the number of files in the first set of data, in both the first data storage partition and in the second data storage partition, and the number of files of the first set of data.

8. The method of claim 7 further comprising:
controlling the addressing scheme so that the first number of files within each given data storage partition of the plurality of data storage partitions is addressed as an independent linear tape file system (LTFS) file system.

9. The method of claim 7 wherein each given data storage partition respectively corresponds to a virtual tape, with each virtual tape being a set of data that is treated as an entirety of a single tape medium by computer components that read from and/or write to the virtual tape.

* * * * *